(12) United States Patent
Dodge et al.

(10) Patent No.: US 8,704,767 B2
(45) Date of Patent: Apr. 22, 2014

(54) ENVIRONMENTAL GESTURE RECOGNITION

(75) Inventors: Steven Dodge, Sammamish, WA (US); Zheng Wang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 985 days.

(21) Appl. No.: 12/362,231

(22) Filed: Jan. 29, 2009

(65) Prior Publication Data
US 2010/0188328 A1 Jul. 29, 2010

(51) Int. Cl.
*G06F 3/033* (2013.01)
*G06F 3/01* (2006.01)

(52) U.S. Cl.
CPC ...................................... *G06F 3/01* (2013.01)
USPC ........................................................ 345/158

(58) Field of Classification Search
USPC .................. 345/156; 715/863; 710/15–16, 73
See application file for complete search history.

(56) References Cited

U.S. PATENT DOCUMENTS

| | | | | |
|---|---|---|---|---|
| 4,500,933 A | * | 2/1985 | Chan | 360/69 |
| 5,554,980 A | * | 9/1996 | Hashimoto et al. | 345/158 |
| 5,754,890 A | * | 5/1998 | Holmdahl et al. | 710/63 |
| 5,821,925 A | * | 10/1998 | Carey et al. | 715/757 |
| 5,874,942 A | * | 2/1999 | Walker | 345/158 |
| 6,189,050 B1 | * | 2/2001 | Sakarda | 710/18 |
| 6,201,554 B1 | * | 3/2001 | Lands | 345/169 |
| 6,256,033 B1 | * | 7/2001 | Nguyen | 715/863 |
| 6,285,757 B1 | * | 9/2001 | Carroll et al. | 345/619 |
| 6,347,290 B1 | * | 2/2002 | Bartlett | 702/150 |
| 6,398,105 B2 | * | 6/2002 | Ramberg et al. | 235/375 |
| 6,466,198 B1 | * | 10/2002 | Feinstein | 345/158 |
| 6,624,824 B1 | * | 9/2003 | Tognazzini et al. | 345/684 |
| 6,704,007 B1 | * | 3/2004 | Clapper | 345/204 |
| 6,907,581 B2 | * | 6/2005 | Noy et al. | 715/863 |
| 7,301,526 B2 | | 11/2007 | Marvit et al. | |
| 7,605,695 B2 | * | 10/2009 | Presicci | 340/511 |
| 8,018,440 B2 | * | 9/2011 | Townsend et al. | 345/173 |
| 2002/0019892 A1 | * | 2/2002 | Kondo et al. | 710/62 |
| 2003/0085870 A1 | * | 5/2003 | Hinckley | 345/156 |
| 2005/0114788 A1 | | 5/2005 | Fabritius | |
| 2005/0125826 A1 | | 6/2005 | Hunleth et al. | |
| 2005/0157908 A1 | * | 7/2005 | Matsugu et al. | 382/107 |

(Continued)

OTHER PUBLICATIONS

Aziz, Abdul, "ShakeLock: Use Motion Gestures & Phone Movement to Lock and Unlock Nokia S60 Device", retrieved at <<http://thinkabdul.com/2008/02/19/shakelock-use-motion-gestures-phone-movement-to-lock-and-unlock-nokia-s60-device/>>, Jan. 9, 2009, pp. 2.

(Continued)

*Primary Examiner* — Dorothy Harris
(74) *Attorney, Agent, or Firm* — John Jardine; Andrew Sanders; Micky Minhas

(57) ABSTRACT

A data-holding subsystem. The data-holding subsystem includes instructions stored thereon that when executed by a logic subsystem in communication with the data-holding subsystem: receive one or more signals, determine a sensor type for each signal of the one or more signals, identify a sensor type specific pattern corresponding to a motion gesture in at least one of the signals, and generate a gesture message based on the motion gesture. The gesture message may be usable by an operating system of a computing device that includes the data-holding subsystem to provide a system-wide function usable by one or more application programs of the computing device to provide an application specific function.

19 Claims, 5 Drawing Sheets

(56) References Cited

U.S. PATENT DOCUMENTS

| | | | |
|---|---|---|---|
| 2006/0158438 A1* | 7/2006 | Hunter | 345/173 |
| 2006/0164382 A1 | 7/2006 | Kulas et al. | |
| 2006/0166620 A1* | 7/2006 | Sorensen | 455/41.1 |
| 2006/0187204 A1* | 8/2006 | Yi et al. | 345/158 |
| 2006/0256082 A1* | 11/2006 | Cho et al. | 345/156 |
| 2007/0006163 A1* | 1/2007 | Aoki et al. | 717/127 |
| 2007/0146321 A1* | 6/2007 | Sohn et al. | 345/158 |
| 2007/0146325 A1* | 6/2007 | Poston et al. | 345/163 |
| 2007/0279390 A1* | 12/2007 | Loukianov | 345/169 |
| 2008/0084385 A1* | 4/2008 | Ranta et al. | 345/157 |
| 2008/0163130 A1 | 7/2008 | Westerman | |
| 2008/0168401 A1 | 7/2008 | Boule et al. | |
| 2008/0250429 A1* | 10/2008 | Lockhart et al. | 719/320 |
| 2009/0225026 A1* | 9/2009 | Sheba | 345/156 |

OTHER PUBLICATIONS

Stegmann, et al., "Multimodal Interaction for Access to Media Content", retrieved at http://www.icin.biz/files/2008papers/Poster-08.pdf>>, pp. 4.

Covert, Adrian, "Sony NV-U83T GPS with Gesture Commands, and Motion Sensor Positioning", retrieved at <<http://gizmodo.com/339860/sony-nv+u83t-gps-with-gesture-commands-and-motion-sensor-positioning>>, Jan. 6, 2008, pp. 6.

* cited by examiner

ENVIRONMENTAL GESTURE RECOGNITION

BACKGROUND

A typical computing application program has little or no knowledge of how a computing device executing the application program is being interacted with in its surrounding environment. More particularly, the application typically has little or no knowledge of how a user physically interacts with the computing device to provide user input that controls operation of the application program. This lack of environmental information may cause the application program to behave in a manner that may be unintuitive to a user or that may result in behavior that does not match the intensions of the user depending on the manner in which the user is providing input to control the computing device. This may be particularly true for mobile computing devices.

SUMMARY

Various embodiments related to generating gestures to control operation of a computing device are provided. For example, one disclosed embodiment provides a data-holding subsystem. The data-holding subsystem includes instructions stored thereon that when executed by a logic subsystem in communication with the data-holding subsystem: receive one or more signals, determine a sensor type for each signal of the one or more signals, identify a sensor type specific pattern corresponding to a motion gesture in at least one of the signals, and generate a gesture message based on the motion gesture. The gesture message may be usable by an operating system of a computing device that includes the data-holding subsystem to provide a system-wide function usable by one or more application programs of the computing device to provide an application specific function.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

At present, there exists no software systems that can leverage data collected from sensor devices of a computing device to generate standardized gestures to control computing device operation that is device agnostic and provides an intuitive control experience for a user. Accordingly, the present disclosure is directed to a computing system that employs gestures to control at least some operation of a computing device on an operating system-wide and/or an application specific level. The gestures may be generated via user actions or environmental changes that may be detected as input via environmental sensors that provide signals to extensible gesture recognition software. The extensible recognition software may generate control commands that may be usable by the operating system and/or applications of the computing device to control operation.

As used herein a "gesture" may be virtually any suitable environmental stimulus that is expressive of an intended effect. Such environmental stimulus may be detected or derived at least in part by sensors. Gestures may be used in addition to or in place of traditional computing device input signals, such as for example, those generated by an explicit user input device that may include a mouse, wheel mouse, keyboard, scroll buttons, optical input, physical switch, etc.

Figure 1:
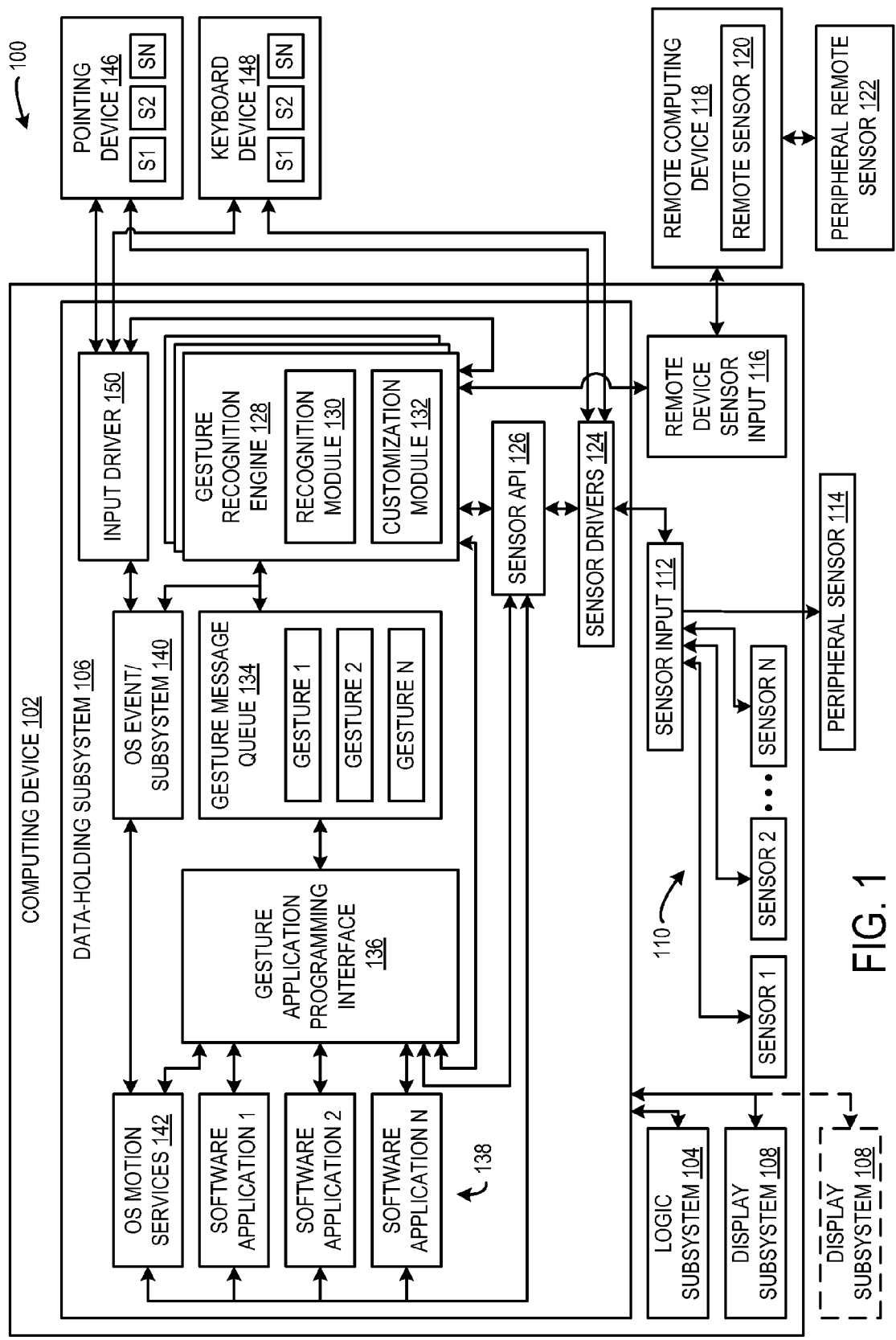
FIG. 1 is a schematic diagram of an embodiment of a computing system in which operation of a computing device may be controlled via gestures.

FIG. 1 illustrates an embodiment of a computing system 100. The computing system 100 may include a computing device 102 that may use gestures created by a user to control operation. Computing device 102 includes a logic subsystem 104, and a data-holding subsystem 106. Computing system 102 may optionally include a display subsystem and/or other components not shown in FIG. 1.

Logic subsystem 104 may include one or more physical devices configured to execute one or more instructions. For example, the logic subsystem may be configured to execute one or more instructions that are part of one or more programs, routines, objects, components, data structures, or other logical constructs. Such instructions may be implemented to perform a task, implement a data type, transform the state of one or more devices, or otherwise arrive at a desired result. The logic subsystem may include one or more processors that are configured to execute software instructions. Additionally or alternatively, the logic subsystem may include one or more hardware or firmware logic machines configured to execute hardware or firmware instructions. The logic subsystem may optionally include individual components that are distributed throughout two or more devices, which may be remotely located in some embodiments.

Data-holding subsystem 106 may include one or more physical devices configured to hold data and/or instructions executable by the logic subsystem to implement the herein described methods and processes. When such methods and processes are implemented, the state of data-holding subsystem 106 may be transformed (e.g., to hold different data). Data-holding subsystem 106 may include removable media and/or built-in devices. Data-holding subsystem 106 may include optical memory devices, semiconductor memory devices, and/or magnetic memory devices, among others. Data-holding subsystem 106 may include devices with one or more of the following characteristics: volatile, nonvolatile, dynamic, static, read/write, read-only, random access, sequential access, location addressable, file addressable, and content addressable. In some embodiments, logic subsystem 104 and data-holding subsystem 106 may be integrated into one or more common devices, such as an application specific integrated circuit or a system on a chip.

In the illustrated embodiment, the components of the data-holding subsystem may represent software constructs. However, in some embodiments, this architecture could combine hardware and software components in a large variety of configurations to achieve the same system functionality. In some embodiments of a multi-purpose operating system, each of the software components that involve data-holding or storage may interact with various forms of storage hardware or storage device infrastructure provided by the operating system. In some embodiments of a mobile or embedded computing system, some of the functionality of components within data-holding subsystem 106 may be distributed to separate pieces of circuitry and/or integrated into other components illustrated in FIG. 1 as appropriate for the hardware implementation. For example, a preprocessing application used to filter signals generated by a sensor or provide gesture related functionality may be executed in firmware of a peripheral sensor device.

In some embodiments, the data-holding subsystem may include computer-readable removable media, which may be used to store and/or transfer data and/or instructions executable to implement the herein described methods and processes.

When included, display subsystem 108 may be used to present a visual representation of data held by data-holding subsystem 106. As the herein described methods and processes change the data held by the data-holding subsystem, and thus transform the state of the data-holding subsystem, the state of display subsystem 108 may likewise be transformed to visually represent changes in the underlying data. Display subsystem 108 may include one or more display devices utilizing virtually any type of technology. Such display devices may be combined with logic subsystem 104 and/or data-holding subsystem 106 in a shared enclosure, or such display devices may be peripheral display devices.

In some embodiments, the display subsystem may act as a user input device. For example, the display subsystem may include a touch screen configured to detect when a user touches the surface of the touch screen. In some embodiments, the display subsystem may include one or more light sensors that detect user input in the form of an entity hovering proximate to a surface of the display subsystem.

Continuing with FIG. 1, computing device 102 may include a plurality of sensors 110 (e.g. sensor 1, sensor 2, sensor N) that may be integrated into the computing device. The plurality of sensors 110 may be environmental sensors configured to measure changes of the computing device relative to the surrounding environment (e.g., computing device orientation, position, motion, etc.) and/or environmental changes relative to the computing device (e.g., user input, ambient light, elapsed time duration, entity position, etc.). The plurality of sensors 110 may generate signals indicating user input among other environmental parameters that may be sent to sensor input 112.

Nonlimiting examples of different types of sensors that may be employed may include an accelerometer, a gyroscope, a camera, a light sensor, and a touch sensor, or virtually any other suitable sensor capable of measuring environmental data. In some embodiments, a sensor may measure two or more environmental changes that generate corresponding signals. Further, a sensor may generate two or more separate signals indicative of environmental changes. For example, an accelerometer may differentiate accelerations above a threshold as "jolts". The accelerometer may send separate signals, one indicating general acceleration, and one indicating "jolts". In this example, the accelerometer could be identified as two sensors in the subject figure.

Sensor input 112 may comprise hardware and/or software that enable signals from the plurality of sensors 110 to be received. For example, the sensor input may include input/output ports that may enable the plurality of sensors to be physically connected. In some embodiments, the sensor input may include wireless technologies that enable wireless communication with some or all of the plurality of sensors. Further, sensor input 112 may be operatively coupled to or in communication with peripheral sensor 114. Peripheral sensor 114 may be located external to communication device 102. For example, a peripheral sensor may include an ambient light sensor positioned external to the computing device that may detect ambient light in the surrounding environment of the computing device. It will be appreciated that, in some cases, the sensor input may receive signals from a plurality of peripheral sensors.

Furthermore, computing device may include remote device sensor input 116 that may be configured to communicate with remote computing device to send and/or receive environmental sensor signals that may be processed to facilitate control of computing device 102 and/or remote computing device 118. The remote computing device 118 may include remote sensor 120 that may be integrated with the remote computing device and may measure environmental changes. Further, the remote computing device 118 may be in communication with peripheral remote sensor 122 that may be located external to remote computing device 118 and may measure environmental changes proximate to the remote computing device. The sensor signals generated by remote sensor 120 and peripheral remote sensor 122 may be received by remote device sensor input and may be considered when generating control commands that dictate operation of computing device 102.

For example, remote device sensor input 116 may include communication technologies, such as wired or wireless radio communication technologies to send and/or receive sensor signal data to/from remote computing device. In some embodiments, the remote device sensor input may include short range transmission technologies (e.g., Bluetooth™). In some embodiments, the remote device sensor input may include long range transmission technologies that enable sensor signals to be received from device(s) located substantially remote to the computing device (e.g., LAN, WAN, etc.).

Furthermore, more than one communication protocol may be combined in order for the signals to propagate between the remote sensor and the computing device. For example, a wireless Ethernet protocol such as 802.11b may be used to transfer sensor signals from a remote computing device to a wireless router, from which the sensor signals travel over Ethernet into a cable modem, from which multiple internet communication technologies (e.g., cable, fiber optic, satellite) may be used to send the sensor signals to another host computing device that may share a nearby sensor which may be connected via a power-line technology (e.g. X-10) to the computing device.

The sensor input 112 may send sensor signals to sensor drivers 124. The sensor drivers 124 may be configured to perform at least some pre-processing on the received signals in order to make them suitable for identification by various software programs of computing device 102. For example, sensor drivers 124 may be configured to perform pre-filtering of the received sensor signals to normalize the signals for further use. In one particular example, the sensor driver applies a low pass filter to an ambient light sensor signal to so that it may be normalized.

The sensor drivers 124 may send the sensor signal data to a sensor application programming interface (API) 126. The sensor API 126 may distribute the sensor signal data to requesting/subscribing software programs of computing device 102. In particular, sensor API 126 may send sensor signal data to gesture recognition engine 128 that may be configured to interpret the sensor signal data to generate gestures that may cause actions in software programs to control operation of the computing device.

Furthermore, sensor API 126 may send sensor signal data directly to other subscribing software application programs, such as a plurality of software applications 138 (e.g., software application 1, software application 2, software application N). The plurality of software applications 138 may utilize the sensor signal data to perform application specific operations that need not be related to gestures. By allowing the sensor signal data to be distributed to different requesting software programs, the sensor data may be used to in multiple different approaches to provide meaningful information for different computing functions. For example, signal data from a camera type sensor may be used to create photographic images while at the same time may provide environmental setting information that may be used along with information from other sensors to generate a confidence level for a given gesture to make gesture detection more reliable. Further, sensor API 126 may send sensor signal data directly to operating system (OS) motion services 142. The OS motion services 142 may use knowledge of the available sensor devices/capabilities to specifically configure the operating system and/or associated services.

The sensor API 126 may send sensor signals (or signal data) to extensible gesture recognition engine 128. The extensible gesture recognition engine 128 may be configured to process the sensor signal data to generate gesture messages or gesture event notifications that may be usable by an operating system of the computing device to provide a system-wide function and/or may be usable by one or more applications of the computing device to provide an application specific function. Further, extensible gesture recognition engine 128 may receive sensor data from input driver 150 and remote device sensor input 116 that may be useable to generate gesture messages.

The extensible gesture recognition engine 128 may include a recognition module 130 to process received signals to generate gestures and a gesture customization module 132 to facilitate calibration and customization of gestures. Recognition module 130 may be configured to receive one or more signals from the sensor API 126, input driver 150, and/or remote device sensor input 116. The recognition module 130 may be configured to determine a sensor type for each signal of the one or more signals that are received. For example, sensor identification information may be provided by the sensor drivers based on the configuration of the sensors with the sensor input. In one example, sensors are identified based on the port of the sensor input to which the sensors are connected.

In some embodiments, extensible gesture recognition engine 128 may include a plurality of modules that are specialized for specific types of sensor hardware. Further, the extensible gesture recognition engine may be configured to allow for additional recognition modules to be plugged-in for recognition of additional instances of sensors or sensor types.

By recognizing the types of sensors that provide the signal data, the extensible gesture recognition engine may monitor each signal for sensor type specific patterns that are associated with the sensor type determined for that signal. For a given type of sensor signal, each sensor type specific pattern may correspond to a different gesture. Furthermore, two or more sensor type specific patterns from different sensor signals that correspond to a composite gesture may be collectively recognized by the extensible gesture recognition engine. The recognition module may maintain a database of sensor type specific patterns and corresponding gestures/composite gestures. Moreover, since available sensors and sensor types may be recognized by the recognition module, the framework of the extensible gesture recognition engine may be general-purpose or device agnostic. In other words, sensor type recognition may allow for flexibility to recognize gestures from different combinations of sensors that are made available. Accordingly, standardized gestures may be recognized using different systems having different sensor configurations.

Furthermore, the use of composite gestures may allow for a larger gesture collection and greater extensibility since additional gestures may be made available for customization. In particular, the extensible gesture recognition engine may be configured to recognize sensor type specific patterns corresponding to customized gestures. The customized gestures may be defined by third parties such as hardware system developers, software application developers, users, etc. In particular customization module 132 may be configured to accept plug-in support for additional customized gestures beyond a predefined set of gestures. Further, support for additional sensor devices and associated sensor type specific patterns may be provided to the customization module. As another example, additional gestures may be customized via user input (by an advanced user or developer) to a gesture calibration user interface 2100 (shown in FIG. 21) generated by customization module 132. As such, the extensible gesture recognition engine may be configured to recognize sensor type specific patterns corresponding to customized gestures. Such extensibility may allow for the extensible gesture recognition engine to be suitable for use with different computing device configurations as well as adaptable to changes or upgrades to the configuration of a particular computing device.

Continuing with recognition module 130, for each sensor signal, the recognition module may be configured to, in response to identification of a sensor type specific pattern, generate a gesture corresponding to that sensor type specific pattern. As discussed above, in one example the pattern is mapped to a corresponding gesture via a database maintained by the extensible gesture recognition engine. In other examples, heuristics may be used to recognize gestures from sensor signals. It will be appreciated that virtually any suitable process may be implemented to convert the set of input signals (i.e., sensor signals) to output signals (i.e., gesture messages) that correspond to a behavior in an application or operating system shell.

Further, the recognition module may be configured to determine a confidence level for the gesture of each signal based on agreement between the one or more signals. In cases where only one signal is generated the confidence level is based on that signal. In cases where a plurality of gestures is generated, the confidence level may be based on the redundancy of the gestures produced by the different signals. In other words, the more redundancy in gestures, the higher the confidence level. In cases where a gesture is identified by sensors of the same type, the confidence level is determined in a straightforward manner. In cases where a gesture is identified by sensors of different types (e.g., webcam+light sensor, or webcam+accelerometer.), the confidence level may be determined in virtually any suitable manner. For example, sensor signals may be weighted according to signal clarity and the confidence level may be determined based on redundancy of the signals with the sensor signals having a higher weight factoring greater into the confidence level. As another example, the signals of different sensors types may be averaged to produce a single "smoother" signal from a "virtual" sensor and the confidence level may be determined based on the virtual signal. In such a case, various gesture recognition components may monitor multiple streams of sensor input. By determining a confidence level based on redundancy between sensor signals, gesture recognition may be made more accurate and reliable.

In some embodiments, the recognition module may receive a plurality of signals over period of time or other duration. The recognition module may be configured to determine usage patterns of the plurality signals learned for the duration. In other words, the recognition module may track the behavior of each signal and may leverage the learned behavior to assess the likelihood of a sensor type specific pattern for one sensor occurring in view of sensor type specific patterns occurring (or not occurring) for one or more other sensor(s). For example, data from a light sensor may be utilized in combination with monitors of user interaction (mouse, keyboard, etc) and the system clock and data about a location to detect that a computing device is only used during certain daylight hours and the usage pattern is "learned" by the recognition module. Accordingly, if a gesture is generated from a signal of an accelerometer in the middle of the night, it may be determined to be less likely that the gesture is accurate and the confidence level for the gesture may be reduced in light of the learned usage pattern.

Once the confidence level is determined for a gesture; the recognition module 130 may be configured to generate a gesture message for the gesture responsive to the confidence level being above a confidence threshold. In some embodiments, the confidence threshold may be predetermined. In some embodiments, the confidence threshold may be calibrated based on heuristics applied to the gestures. For example, the confidence threshold may be calibrated automatically by customization module 132 based on sensor functionality. As another example, the confidence threshold may be "learned" by monitoring for user correction of false-positive reports. In one particular example, a user performs a "tilt away" gesture (to scroll down) twice such that the document scrolls by two pages, and then the user immediately scrolls up one page by touching the screen. This is interpreted by the recognition module to be a user correction of a false-positive report that the sensitivity of the scroll gesture is set too high. Accordingly, the recognition module automatically lowers the sensitivity of the scroll gesture, and over time the adjustments accumulate until the system is well tuned.

In some embodiments, to facilitate automatic calibration, customization module 132 may be configured to track input history in data-holding subsystem (e.g., memory). Further, a plurality of sensor specific customization modules may be in communication with each other so that knowledge of various ways (i.e., sensor signals) the user would accomplish the same gesture (as well as correct for it by doing the reverse gesture) could be known by each recognition module. Further, user input from input driver 150 may be used to detect user correction of a false-positive gesture response. Using the data from the input driver and each of the sensor specific modules, the false-positive correction may be learned resulting in automatic gesture calibration. In some embodiments, this logic could be encapsulated in a separate learning module (not shown) of the extensible recognition engine.

As another example, the confidence threshold may be calibrated via user input to a gesture calibration user interface 2100 (see FIG. 21) generated by customization module 132.

In some embodiments, the customization module may be configured to check for degradation of one or more signals responsive to the confidence level being below the confidence threshold. For example, a sensor signal may become noisy due to interference and the sensor may dampen the signal resulting in the signal not creating the sensor type specific pattern corresponding to the gesture. The extensible gesture recognition engine may be configured to determine that the signal has been dampened and thus may temporarily ignore the signal till conditions change. Further, the extensible gesture recognition engine may be configured to, upon detection of degradation of one or more signals, determine a new confidence level based on agreement between signals that are non-degraded. Accordingly, gestures may be recognized reliably even in the event of signal degradation.

Further in some embodiments, the sensor API may accommodate sensor signal degradation through support for sensor properties like accuracy and error. In other words, the sensor device itself may facilitate this process by exposing a property to the sensor API that reduces the need for the sensor API or client application or gesture recognition module to carefully monitor the incoming sensor signal.

In some embodiments, the extensible gesture recognition engine may be configured to delay distribution of the gesture message for control of the computing device responsive to the confidence level of the gesture being below the confidence threshold. In particular, a confidence level below the confidence threshold may indicate false positive identification of a gesture. In order to maintain reliable gesture recognition, the extensible gesture recognition engine may delay distribution of the gesture message until a like gesture having a confidence level above the confidence threshold is subsequently identified.

In some cases, the extensible gesture recognition engine may generate two gestures, in other cases the engine may absorb the first gesture based on historical "learned" behavior that dictates whether to absorb the weak signal's gesture or whether to send it through along with the strong signal's gesture. In yet some other cases, the scenario may dictate whether to absorb or not generate the gesture. For example, in a scrolling case it would be suitable to absorb a weak signal and "teach" the user to be more explicit with the physical interaction. In another example with a series of (for example) six light sensors across which the user can sweep their hand in midair to indicate scrolling, a weak signal followed by successively stronger signals may strengthen the confidence level so that gesture messages may be generated for all six sensor signals. The latency of the gesture messages based on the confidence level may make the gesture control more robust since the likelihood of performing unintended computing operations may be reduced.

As discussed above, extensible gesture recognition engine 128 may enable customized gestures to be created as well as additional sensor signals to be identified and usable for gesture customization and calibration via customization module 132. In particular, customization module 132 may be configured to integrate customized gestures into a set of standardized gestures. The customized gestures may be generated by applications or services that plug-in or provide gesture customization data to the customization module. The customization module may be configured to calibrate the confidence threshold used to generate gesture messages. The calibration may be performed according to virtually any suitable method as described above. The customization module may be configured to enable sensor calibration by leveraging information from one or more sensor signals.

Figure 21:
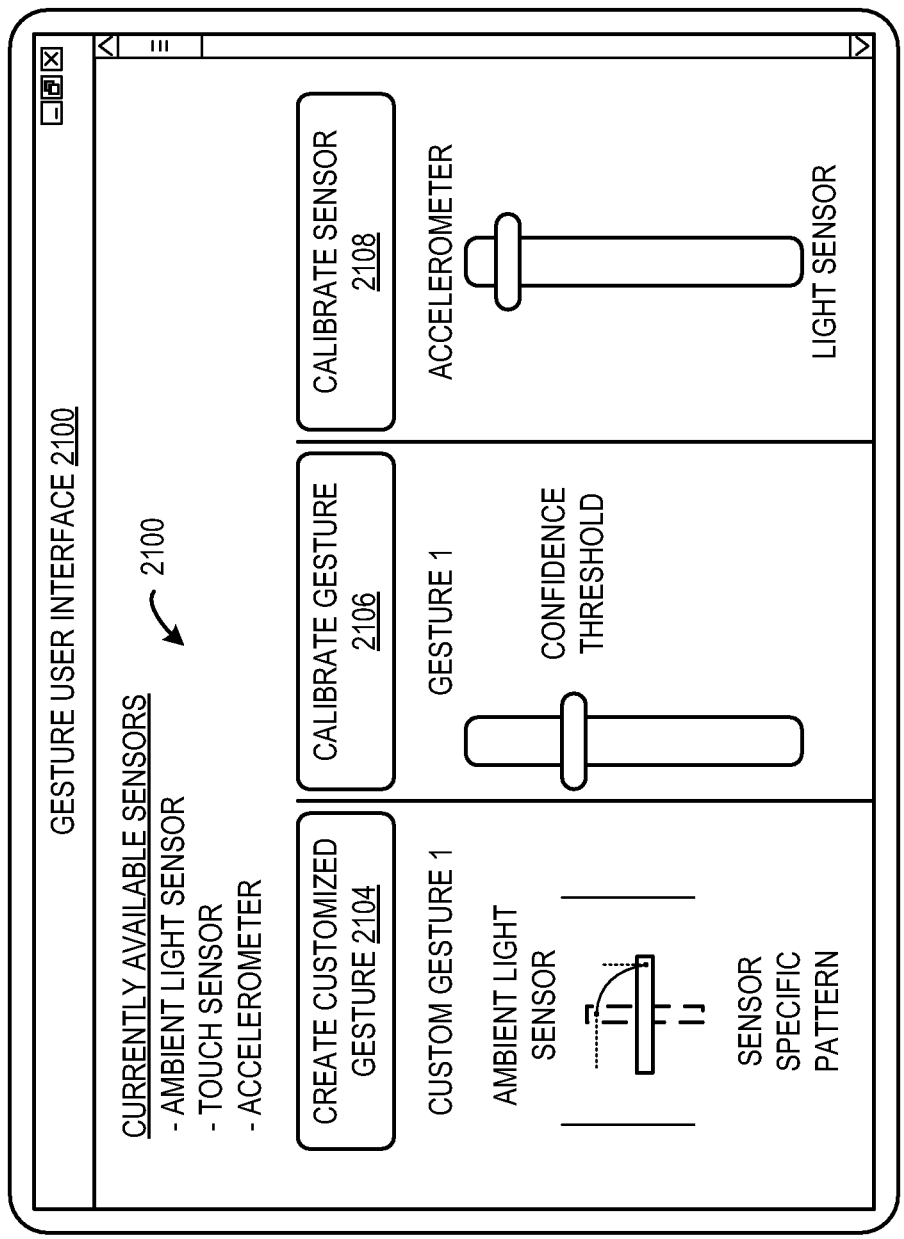
FIG. 21 is a view a gesture graphical user interface.

In some embodiments, customization module may be configured to generate a gesture user interface 2100 (shown in FIG. 21). The gesture user interface may be configured to permit user input to adjust the confidence threshold of a gesture, and permit user input to create customized gestures based on available signals of different sensors received by the extensible gesture recognition engine. Further, the gesture user interface may be configured to enable sensor calibration by leveraging information from one or more other sensor signals. The gesture user interface 2100 will be discussed in further detail below with reference to FIG. 21.

The extensible gesture recognition engine 128 may produce gesture messages that may be usable by one or more applications of computing device 102 to provide an application specific function. In particular, extensible gesture recognition engine 128 may send gesture messages to a gesture message queue (or gesture event notification queue) 134 where a gesture API 136 may map application specific functions for a plurality of subscribing applications (e.g., application 1, application 2, application N) 138 to a specified gesture message. In particular, gesture API 136 may access a database that links application specific functions to gesture messages. The database may be updated with maps that link customized gestures with application specific functions. The gesture message queue 134 may allow a plurality of applications to handle the same motion gesture message without blocking the extensible gesture recognition engine 128. It will be appreciated that the gestures may be handled either synchronously or asynchronously in a non-blocking manner. It will be appreciated that in some embodiments, one or more of the plurality of software applications may at least partially exist outside of the data holding subsystem. For example, a software application may be a web application executed via a web browsing program.

This allows the extensible gesture recognition engine 128 to run out of process from the plurality of applications 138 subscribing to the gesture API 136 resulting in greater computing efficiency. However, in some embodiments, a selected application may leverage the extensible gesture recognition engine in a specialized manner such that the application may host it directly. In this case, an instance of the recognition module and/or the extensible software recognition engine may be executed by the selected application.

It will be appreciated that gestures may also provide function (application or system-wide) that affects operation of the computing device hardware. For example, a clamshell type netbook computing device may include a hinge equipped with a small motor and hinge sensor. With the lid closed, a user may perform a tilt gesture normally associated with scrolling. The extensible gesture recognition engine may receive signals from an accelerometer indicating the tilt as well as a signal from the hinge sensor indicating that the lid is closed. The extensible gesture recognition engine may leverage the two signals to generate a composite gesture that provides a function to send a signal to the hinge motor to open the lid of the netbook. Furthermore, the composite gesture may provide software/UI specific functionality in cooperation with the hardware functionality. For example, upon opening of the lid the gesture may result in a particular message being displayed.

In another example where gestures provide hardware specific function, a user interface may be displayed responsive to user presence or proximity to the computing device. For example, the computing device may be positioned on a table showing photographs, and as the user approaches and gets within a range where the user could touch the screen, the detected proximity of the user may generate a gesture that provide application specific functionality to the photograph viewing application, such as a command to display user interface controls on the display screen. Further, changes in user proximity, as measured thru infra-red motion sensor or other environmental sensors, for example, could be interpreted as a gesture and signal the machine to awake from standby, open the lid if needed, and display the user interface that was previously hidden while the machine was idle.

In some embodiments, where computing device hardware operation is affected by gesture recognition components of the extensible gesture recognition and associated architecture be designed in such a way to run outside of the CPU so that gesture recognition could happen while the machine is a sleep or other mode. It will be appreciated that distribution of some or all of the components of the architecture to separate circuitry to facilitate such a scenario lie within the scope of the present disclosure.

Furthermore, extensible gesture recognition engine 128 may send generated gesture messages to operating system (OS) event subsystem 140 that may be configured to map the gesture message to system-wide functions that may control computer operation on a system-wide level beyond a particular application. OS event subsystem 140 may send the system-wide function to operating system motion services 142 to execute the system-wide function.

The OS motion services 142 may be in communication with sensor API 126 so that the OS motion services may take advantage of specialized knowledge of available sensor devices or capabilities. The OS motion services 142 may be in communication with gesture API 136 to monitor the gesture message queue and/or utilize other functionality provided by the gesture API.

The OS event subsystem 140 may receive explicit user interaction signals generated by pointing device (e.g., mouse, stylus, etc) 146 and/or keyboard device 148, among other explicit user input devices via input driver 150, in such embodiments where these devices are implemented. In such embodiments, computing device 102 may receive user input via these explicit user input devices as well user input detected by environmental sensors (e.g., accelerometer, touch sensor) to allow for greater user input flexibility of the computing device.

Furthermore, in some embodiments, input driver 150 may be in communication with extensible gesture recognition engine 128. The extensible gesture recognition engine 128 may be configured to, in some cases, prioritize gestures generated by the explicit input devices over gestures generated by environmental sensors and vice versa. For example, the extensible gesture recognition engine may be configured to prioritize a scrolling gesture generated from sensor signals of a trackpad type explicit user input device over a scrolling gesture generated from a change in orientation of a mobile computing device as detected by an accelerometer. As another example, active input from a mouse or keyboard might in some cases cause the extensible gesture recognition engine to ignore gesture signals originating from environmental sensors. In other cases, active input might influence which gesture is generated. An example of the latter cases may include signals indicating a modifier key (e.g. Shift) from a keyboard device to change from a slow scroll gesture to a rapid scroll gesture.

In some embodiments, sensors within an explicit user input device may be leveraged by the gesture recognition engine 128. In particular, pointing device 146 may include a plurality of sensors (i.e., S1, S2, SN) that may generate signals that may be sent to sensor drivers 124 to be used for gesture recognition. For example, the plurality of sensors of the pointing device may be infrared sensors that may be as dual-purpose peripheral sensors. Further, keyboard device 148 may include a plurality of sensors (i.e., S1, S2, SN) that may send signals to sensor drivers 124 to be used for gesture recognition. For example, the keyboard device may include light sensors in each key of the keypad that may detect an object (e.g., a hand) passing over the keyboard that may be used to generate a gesture.

It will be appreciated that the general-purpose nature of the above described gesture recognition framework may allow for implementation on virtually any suitable computing device. In particular, the flexibility to identify types of environmental signals and explicit user input device signals to generate gestures allows for adaptability to different computing software architectures and hardware device configurations. Moreover, the extensibility of the customization modules of the extensible gesture recognition engine may allow for continued adaptability through the customization of additional gestures and recognition of additional sensors.

Figure 2:
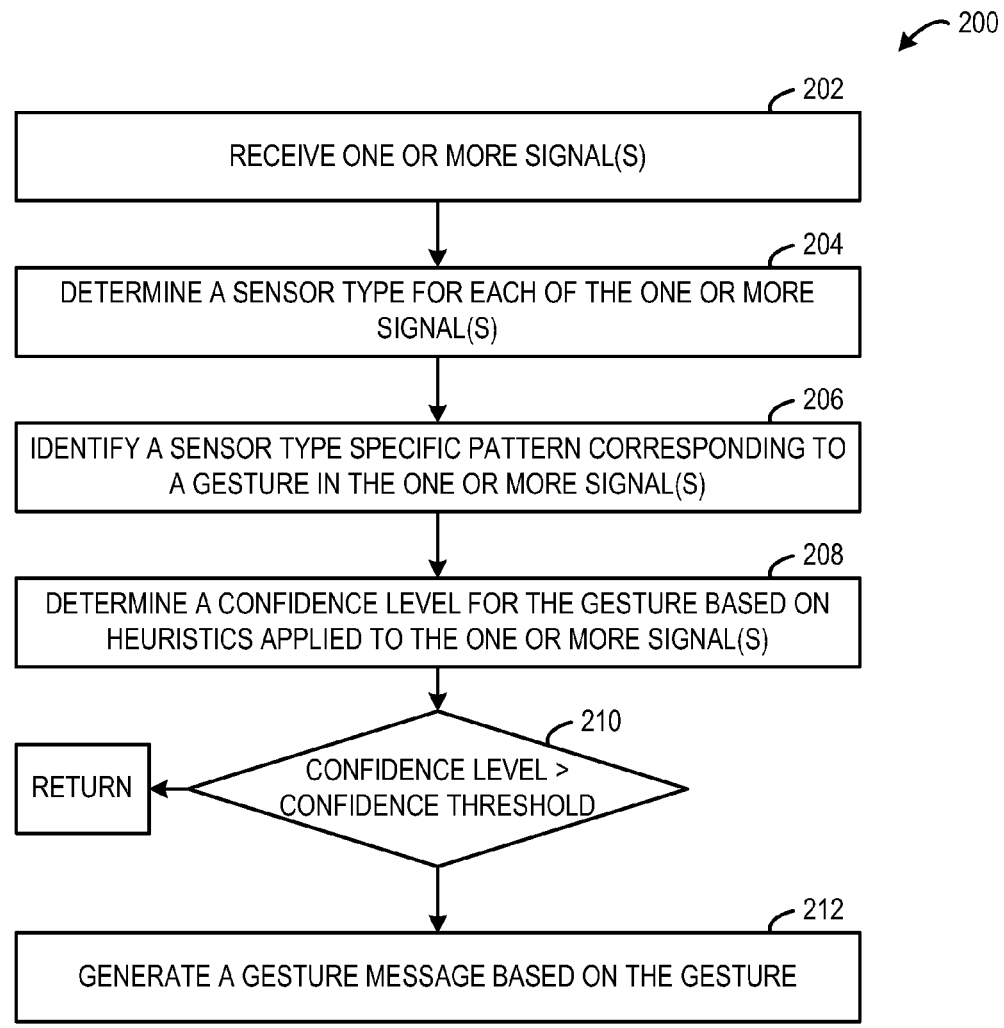
FIG. 2 is a flow diagram of an embodiment of a method for generating gestures from sensor signals to control operation of a computing device.

FIG. 2 illustrates a flow diagram of an embodiment of a method for generating gestures from environmental/motion sensor signals to control operation of a computing device. Method 200 begins at 202 where the method may include receiving one or more signal(s). The one or more signal(s) may be generated by one or more environmental sensor(s). At 204, the method may include determining a sensor type for each of the one or more sensor(s). The sensor type may be used to monitor the signals for sensor type specific patterns. At 206, the method may include identifying a sensor type specific pattern corresponding to a gesture in the one or more signal(s). At 208, the method may include determining a confidence level for the gesture based heuristics applied to the sensor signals such as the one or more signal(s) being in agreement or other heuristics such as learned sensor behavior. At 210, it may be determined if the confidence level is greater than a confidence threshold. If the confidence level is above the confidence threshold, the method moves to 212. Otherwise, the confidence level is below the confidence threshold and the method returns to other operation.

At 212, the method may include generating a gesture message based on the gesture. The gesture message may be usable to provide an application specific function for one or more applications and/or usable to provide a system-wide function.

The above described method may be performed to process signal received from environmental sensors to recognize gestures, in some cases motion gestures, that may be used to provide functionality to control a computing device. The method may take advantage of data collected from sensors to provide an intuitive computing device control experience that may be applicable to mobile computing device applications that need not receive user input via a keyboard device or pointing device or where providing user input via a keyboard device or pointing device may be less intuitive. Note the method may be equally applicable to non-mobile applications where for example user proximity is interpreted as a gesture.

In some embodiments, the above described method may be tied to a computing system. As an example, FIG. 1 schematically shows a computing system 100 that may perform the above described method. In particular, the above described method may be implemented as instructions stored in data holding subsystem 106 and performed by extensible gesture recognition engine 128 executable by logic subsystem 104.

Figure 3:
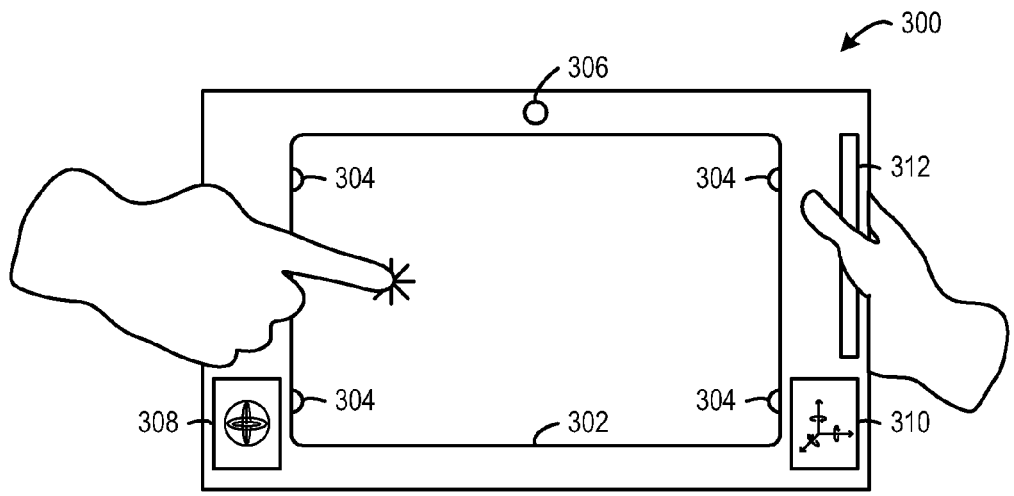
FIG. 3 is a schematic diagram of an embodiment of a mobile computing device including a plurality of sensors.

FIG. 3 schematically illustrates an embodiment of a mobile computing device 300 that may include a plurality of environmental or motion sensors to detect user input, environmental changes relative to the mobile computing device, and/or changes of the mobile computing device relative to the surrounding environment. Note that the mobile computing device is exemplary and is provided as a way of illustrating the concept of motion and environmental gestures, and the present disclosure is not limited to facilitating such gestures and not limited to implementation in a mobile device.

The mobile computing device 300 may include a touch screen 302, a plurality of light sensors 304, a camera 306, a gyroscope 308, an accelerometer 310, and a touch or slide sensor 312. It will be appreciated that in some embodiments the mobile computing device may include additional (or alternative) sensors. In some embodiments, some of the above described sensors may be omitted. In some embodiments, some of the above described sensors may be peripheral sensors in communication with the mobile computing device.

The touch screen 302 may be configured to detect touch input from a user or a device controllable by a user (e.g., a stylus). Touch screen 302 may include a plurality of light sensors 304 that may be configured to detect input proximate to touch screen 302 such as actions performed by a user. The plurality of light sensors 304 may further detect environmental conditions proximate to touch screen 302, such as ambient light conditions, for example.

The camera 306 may be configured to detect environmental conditions relative to mobile computing device 300. For example, camera 306 may detect a position of a feature of a user be (e.g., the user's eyes) controlling mobile computing device 300. The camera 306 may track changes in position of the feature of the user that generates a gesture. In one example, a mobile computing device rotation gesture is generated based on the type of position change of the feature of the user. For example, the eyes of the user as detected by the camera may rotate ninety degrees.

The gyroscope 308 may be configured to detect rotation of mobile computing device 300 in three dimensions. For example, a rotation of mobile computing device 300 as detected by gyroscope 308 may generate a tilt gesture.

The accelerometer 310 may be configured to detect acceleration of mobile computing device 300 in three dimensions. For example acceleration of mobile computing device 300 in a particular direction as detected by accelerometer 310 may generate a translation or shake gesture. As another example, accelerometer 310 may detect rotation of mobile computing device 300 that may be compared to the signal generated by gyroscope 308 to confirm that a tilt gesture has been performed on the mobile computing device.

The touch or slide sensor 312 may be configured to detect a position user's hand on the touch or slide sensor that may generate a gesture. Further, touch or slide sensor 312 may be configured to detect an orientation of a user's hand grasping mobile computing device 300. The signal from touch or slide sensor 312 may be used to generate a gesture. In some cases, the position or orientation of a user's hand as detected by touch or slide sensor 312 may prevent a gesture from being generated based on usage patterns learned for the touch or slide gesture. For example, a rotation gesture may be prevented from being generated based on the way the user is grasping mobile computing device 300. Such gesture prevention may occur based on the confidence level of the gesture being low (i.e., below the confidence threshold) determined based on the learned usage patterns for touch or slide sensor 312. In some embodiments, touch strips may be located around the entire perimeter and/or rear of the mobile computing device to improve the accuracy of detection of how a user is holding the mobile computing device.

Figure 5:
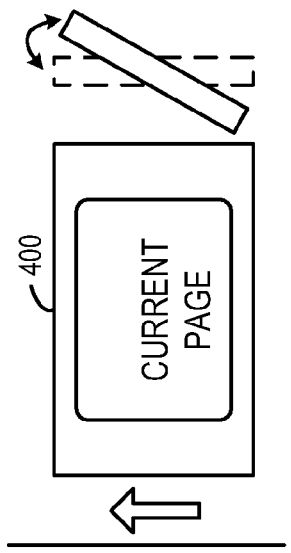
FIG. 5 is a view of the mobile computing device of FIG. 4 rotated counterclockwise along a relative X-axis.
Figure 6:
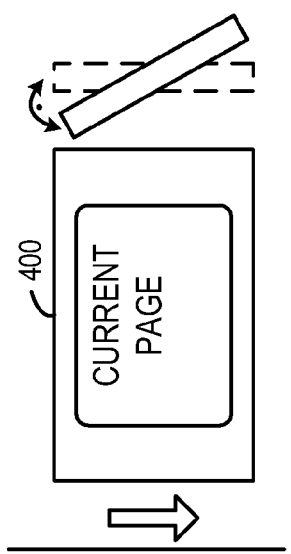
FIG. 6 is a view of the mobile computing device of FIG. 4 rotated clockwise along the relative X-axis.
Figure 4:
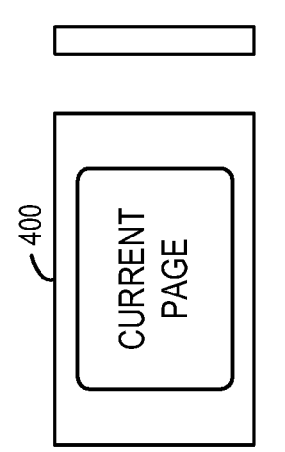
FIG. 4 is a view of a mobile computing device in a first position.

FIGS. 4-20 illustrate example gestures that may be generated responsive to identification of sensor type specific patterns of various environmental sensors. FIGS. 4-6 illustrate toward/away tilt gestures that may provide application specific scrolling functions that may be generated responsive to identification of sensor type specific patterns of various environmental sensors. FIG. 4 schematically illustrates a mobile computing device 400 in a first position. The mobile computing device 400 displays a current page of an application, such as a web browser, for example. In FIG. 5, mobile computing device 400 is illustrated rotated counterclockwise around a relative X-axis from the first position as shown in the right side view of the mobile computing device. The rotation may cause the top surface of the mobile computing device to move towards the user. The counterclockwise rotation generates a tilt towards the user gesture that provides an application specific downward scroll function that causes the currently displayed page to scroll down the page. In FIG. 6, mobile computing device 400 is illustrated rotated clockwise around the relative X-axis from the first position as shown in the right side view of the mobile computing device. The rotation may cause the top surface of the mobile computing device to move away from the user. The clockwise rotation generates a tilt away from the user gesture that provides an application specific upward scroll function that causes the currently displayed page to scroll up the page.

In one example, the above described tilt gestures are generated responsive to identification of a sensor type specific pattern of a signal produced by a gyroscope sensor. In another example, the above described tilt gestures are generated responsive to identification of a sensor type specific pattern of a signal produced by an accelerometer sensor. In yet another example, the above described tilt gestures are generated responsive to identification of a sensor type specific pattern of a signal produced by a gyroscope sensor and an accelerometer sensor.

Figure 8:
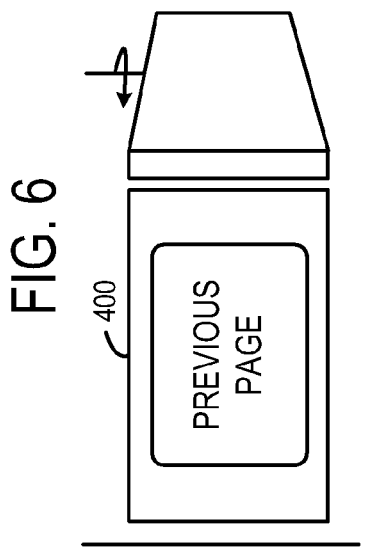
FIG. 8 is a view of the mobile computing device of FIG. 8 rotated counterclockwise along a relative Y-axis.
Figure 9:
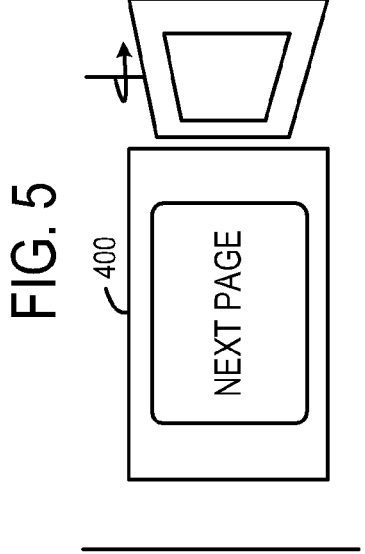
FIG. 9 is a view of the mobile computing device of FIG. 8 rotated clockwise along a relative Y-axis.
Figure 7:
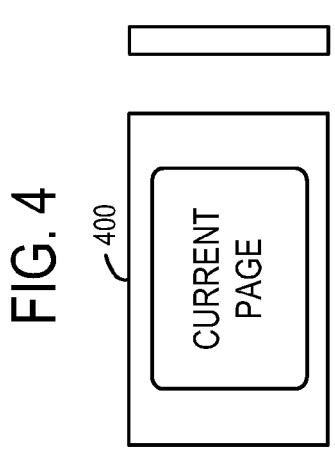
FIG. 7 is a view of a mobile computing device in a first position.

FIGS. 7-9 illustrate right/left tilt gestures that may provide application specific page navigation functions (e.g., forward, back) that may be generated responsive to identification of sensor type specific patterns of various environmental sensors. FIG. 7 schematically illustrates a mobile computing device 400 in a first position. The mobile computing device 400 displays a current page of an application, such as a web browser, for example. In FIG. 8, mobile computing device 400 is illustrated rotated counterclockwise around a relative Y-axis from the first position. The counterclockwise rotation generates a tilt right gesture that provides an application specific next page (or forward) function that causes the next page to be displayed. In FIG. 9, mobile computing device 400 is illustrated rotated clockwise around the relative Y-axis from the first position. The clockwise rotation generates a left tilt gesture that provides an application specific previous (or back) function that causes the previous page to be displayed.

In some embodiments, the tilt gesture may be selectively generated based on a user grasping mobile computing device 400 with one hand as detected by a touch sensor.

Figure 11:
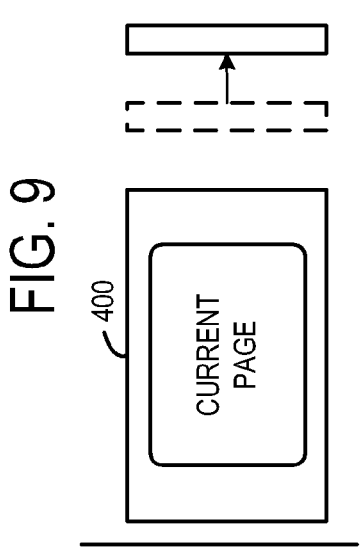
FIG. 11 is a view of the mobile computing device of FIG. 10 translated forward along the relative Z-axis.
Figure 12:
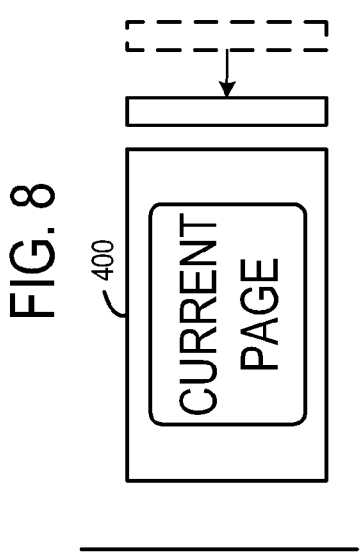
FIG. 12 is a view of the mobile computing device of FIG. 10 translated backward along the relative Z-axis.
Figure 10:
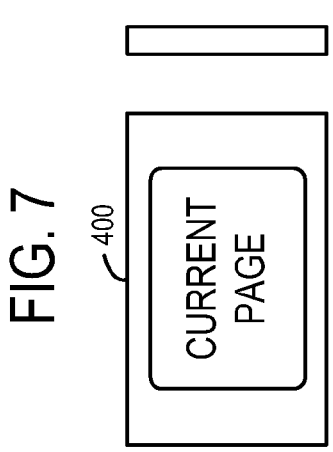
FIG. 10 is a view of a mobile computing device in a first position.

FIGS. 10-12 illustrate toward/away translation gestures that may provide application specific zoom functions that may be generated responsive to identification of sensor type specific patterns of various environmental sensors. FIG. 10 schematically illustrates a mobile computing device 400 in a first position. The mobile computing device 400 displays a current page of an application. In FIG. 11, mobile computing device 400 is illustrated translated toward a user along a relative Z-axis from the first position. The forward translation generates a zoom in gesture that provides an application specific enlargement function that causes content on the currently displayed page to be enlarged. In FIG. 12, mobile computing device 400 is illustrated translated away from the user along the relative Z-axis from the first position. The backward translation generates a zoom out gesture that provides an application specific reduction function that causes content on the currently displayed page to be reduced.

Figure 13:
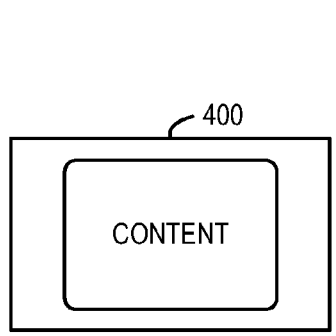
FIG. 13 is a view of a mobile computing device in a first position.
Figure 14:
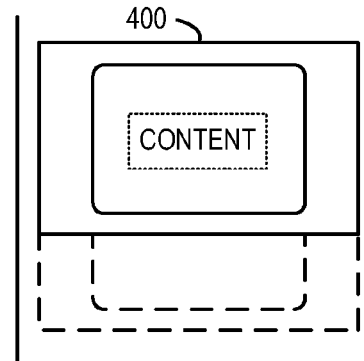
FIG. 14 is a view of the mobile computing device of FIG. 13 translated up along the relative Y-axis.
Figure 15:
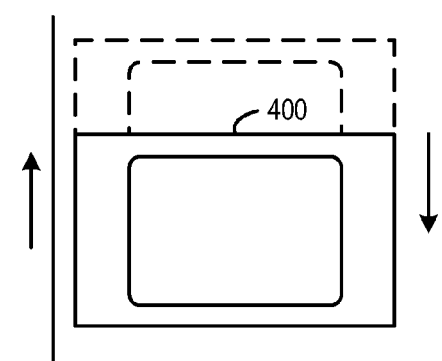
FIG. 15 is a view of the mobile computing device of FIG. 13 translated down along the relative Y-axis.

FIGS. 13-15 illustrate up/down translation gestures that may provide application specific editing functions that may be generated responsive to identification of sensor type specific patterns of various environmental sensors. FIG. 13 schematically illustrates a mobile computing device 400 in a first position. The mobile computing device 400 displays content on a page. In FIG. 14, mobile computing device 400 is illustrated translated up along the relative Y-axis from the first position. The up translation generates an upward translation gesture that provides an application specific select for editing function that causes content on the currently displayed page to be highlighted for editing. In FIG. 15, mobile computing device 400 is illustrated translated down along the relative Y-axis from the first position. The down translation generates a down translation gesture that provides an application specific editing function that causes the highlighted content on the currently displayed page to be edited. In the illustrated example, the highlighted content is cut from the currently displayed page.

It will be appreciated that the up/down translation gesture may be mapped to virtually any suitable editing function. In some embodiments, the editing function may be selected via user input.

Figure 16:
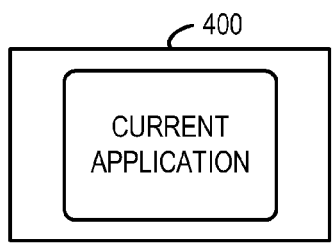
FIG. 16 is a view of a mobile computing device in a first position.
Figure 17:
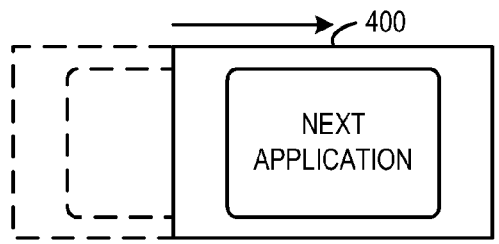
FIG. 17 is a view of the mobile computing device of FIG. 16 translated right along the relative X-axis.
Figure 18:
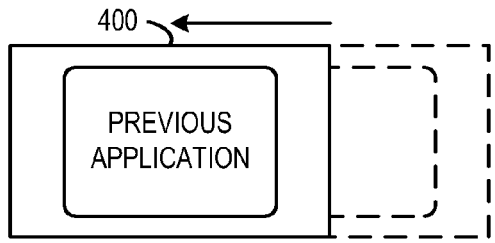
FIG. 18 is a view of the mobile computing device of FIG. 19 translated left along the relative X-axis.

FIGS. 16-18 illustrate right/left translation gestures that may provide system-wide application or task switching functions that may be generated responsive to identification of sensor type specific patterns of various environmental sensors. FIG. 16 schematically illustrates a mobile computing device 400 in a first position. The mobile computing device 400 displays a current application. In FIG. 17, mobile computing device 400 is illustrated translated right along the relative X-axis from the first position. The right translation generates a right translation gesture that provides a system-wide function that causes the next application to be displayed. In FIG. 18, mobile computing device 400 is illustrated translated left along the relative X-axis from the first position. The left translation generates a left translation gesture that provides a system-wide function that causes the previous application to be displayed.

Figure 19:
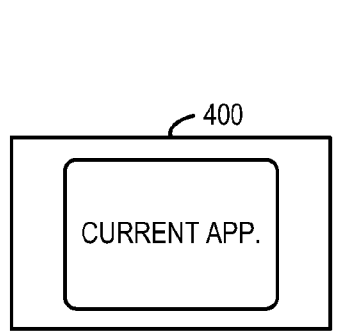
FIG. 19 is a view of a mobile computing device in a first position.
Figure 20:
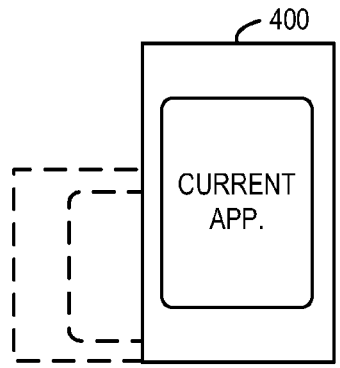
FIG. 20 is a view of the mobile computing device of FIG. 19 rotated clockwise along the relative Z-axis.

FIGS. 19-20 illustrate rotation gestures that may provide application specific display rotation functions that may be generated responsive to identification of sensor type specific patterns of various environmental sensors. FIG. 19 schematically illustrates a mobile computing device 400 in a first position oriented horizontally. The mobile computing device 400 displays a current page in a landscape layout. In FIG. 20, mobile computing device 400 is illustrated rotated clockwise around the relative Z-axis from the first position. The clockwise rotation generates a rotate right gesture that provides an application specific display rotation function that causes the currently page of the application to be displayed in a portrait layout. In some embodiments, the display layout may be changed responsive to the mobile computing device being held in a fixed position after a rotation for a predetermined duration.

In one example, the above described tilt/rotation gestures are generated responsive to identification of a sensor type specific pattern of a signal produced by an accelerometer sensor. In another example, the above described tilt/rotation gestures are generated responsive to identification of a sensor type specific pattern of a signal produced by a camera sensor based on a change in position of a feature of the user or other proximate feature. In yet another example, the above described tilt/rotation gestures are generated responsive to identification of a sensor type specific pattern of a signal produced by an accelerometer sensor and a camera sensor.

In one example, the above described translation gestures are generated responsive to identification of a sensor type specific pattern of a signal produced by an accelerometer sensor. In another example, the above described translation gestures are generated responsive to identification of a sensor type specific pattern of a signal produced by a camera sensor based on a change in position of a feature of the user or other proximate feature. In yet another example, the above described translation gestures are generated responsive to identification of a sensor type specific pattern of a signal produced by an accelerometer sensor and a camera sensor.

In some embodiments, the translation gestures may be generated responsive to identification of a sensor type specific pattern indicating a shake action in which the mobile computing device is translated in a first direction then a second direction during a predetermined duration. In some embodiments, the translation gestures may be responsive to identification of a plurality of shake actions.

It will be appreciated that the gestures described above with reference to FIGS. 3-20 are exemplary and numerous other gestures may be generated from environmental sensor signals. For example, the above described gestures may be included in a set of standardized gestures that may be applied to a mobile computing device. Different sets of standardized gestures may be applied to different computing device configurations. Further, customized gestures may be added to the standardized set based on the specific computing device configuration.

FIG. 21 illustrates an embodiment of a gesture user interface 2100 that may be generated by customization module 132 of FIG. 1, in some embodiments. The gesture user interface 2100 may display a list 2102 of currently available sensors that may be leveraged to create customized gestures. The list 2102 of currently available sensors may be generated by the extensible gesture recognition engine based on determining the sensor type of signals received by the extensible gesture recognition engine. The gesture user interface 2100 may include a create customized gesture selector 2104 that may be configured to permit user input to create customized gesture based on a available signals of different sensors received by the extensible gesture recognition engine. In particular, create customized gesture selector 2104 may permit user input to define a sensor specific pattern for one or more signals that may be identified to generate the customized gesture. Further, the create customized gesture selector 2104 may permit user input to define sensor specific patterns for two or more signal that may be collectively identified to generate a customized composite gesture.

The gesture user interface 2100 may include a calibrate gesture selector 2106 configured to permit user input to adjust the confidence threshold of a selected gesture. In the illustrated example, a confidence threshold may be adjusted along a meter to adjust the confidence threshold. In some embodiments, user input may select different aspects considered when determining a confidence level of a selected gesture. Non-limiting examples of aspect that may be selected include learned usage patterns and the number of redundant gestures used to determine a confidence level.

The gesture user interface 2100 may include a calibrate sensor selector 2108 configured to enable sensor calibration by leveraging information from a one or more other sensor signals. For example, a level of signal dampening to compensate for signal degradation may be adjusted based on information from one or more other signals. The calibrate sensor selector 2108 may permit user adjustment to select or weight certain sensor signals over other sensor signals.

The above described gesture user interface may enable a user to calibrate sensors and customize gestures according to their personal preference. Accordingly, a user may have a more intuitive user experience when controlling a computing device using gestures.

In some embodiments, the customization module 132 of FIG. 1 may perform the functionality provided by gesture user interface 2100 automatically instead of (or in addition to) providing gesture user interface 2100. In particular, customization module 132 may allow a third party (e.g., an original equipment manufacturer constructing a computing device with certain sensors included, an independent software vendor building a software application to take advantage of certain sensors available in a popular machine in the market, or an independent hardware vendor constructing a specialized add-on for specialized applications) to add new sensors to the gesture recognition platform. In other words, the customization module may be configured to add a new signal to a list of available sensor signals used for gesture recognition in response to receiving the new signal from a sensor in communication with the extensible gesture recognition engine.

For example, an accelerometer built by an independent hardware vendor may be configured to generate an acceleration signal and a jolt signal. The customization module may be configured to provide extensible gesture functionality responsive to the accelerometer communicating with the extensible gesture recognition engine. In particular, the customization module may identify the sensor type of the signals being received. In some cases, the customization module may be configured to combine the "raw" acceleration and jolt signals to form a composite signal that may be calibrated. Further, the customization module may facilitate creation of customized gestures based on the signals from the accelerometer sensor. Further still, a confidence threshold for gestures generated based on the signals from the accelerometer sensor may be set by the customization module. It will be appreciated that the above described logic may be integrated into hardware, or may be provided as a software package that integrates with the gesture API.

The customization module 132 may be configured to define one or more customized gestures based on one or more signals from the list of available sensor signals. Customized gestures may be defined by third party software applications or third party hardware devices. For example, a third party sensor device may communicate with the computing device or be plugged-in to the extensible gesture recognition engine, and software supporting the third party sensor device may provide input to the customization module to create customized gestures based at least in part on signals from the third party sensor device.

Furthermore, customization module 132 may be configured to adjust the confidence threshold for various gestures based on heuristics applied to the sensors generating the gestures or other related scenarios as discussed above. In some embodiments, a third party software application or a third party hardware device may provide input that dictates a level of adjustment of the confidence threshold for a given gesture.

In some embodiments, the above described gesture customization, gesture calibration, and sensor extensibility functionality provided by the customization module may be made available to third party software or third party hardware via the gesture API (or a separate gesture extensibility API). Further, in some embodiments, the gesture extensibility API may be used in place of the gesture user interface to provide extensibility functionality to a third party.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

It will be appreciated that the computing devices described herein may be any suitable computing device configured to execute the programs described herein. For example, the computing devices may be a mainframe computer, personal computer, laptop computer, portable data assistant (PDA), computer-enabled wireless telephone, networked computing device, or other suitable computing device, and may be connected to each other via computer networks, such as the Internet. These computing devices typically include a processor and associated volatile and non-volatile memory, and are configured to execute programs stored in non-volatile memory using portions of volatile memory and the processor. As used herein, the term "program" refers to software or firmware components that may be executed by, or utilized by, one or more computing devices described herein, and is meant to encompass individual or groups of executable files, data files, libraries, drivers, scripts, database records, etc. It will be appreciated that computer-readable media may be provided having program instructions stored thereon, which upon execution by a computing device, cause the computing device to execute the methods described above and cause operation of the systems described above.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A data-holding subsystem including instructions stored thereon that when executed by a logic subsystem in communication with the data-holding subsystem:
   receive one or more signals from a set of sensors; responsive to receiving the one or more signals, determine a sensor type for each sensor in the set of sensors, thereby recognizing which of a plurality of different possible sensors are included in the set of sensors;
   identify a motion gesture corresponding to a sensor type specific pattern in at least one of the signals, the motion gesture also corresponding to one or more other sensor type specific patterns in signals receivable from different types of sensors; and
   generate a gesture message based on the motion gesture, the gesture message being usable by an operating system of a computing device that includes the data-holding subsystem to provide a system-wide function usable by two or more application programs of the computing device to provide an application specific function, the operating system configured to provide the same system-wide function to application programs when the operating system is executed on a different computing device responsive to identifying the one or more other sensor type specific patterns in signals received from the different types of sensors.

2. The data-holding subsystem of claim 1, wherein the sensor type includes one or more of an accelerometer, a gyroscope, a camera, a light sensor, and a touch sensor.

3. The data-holding subsystem of claim 1, wherein the computing device is a mobile computing device and the one or more signals are generated by environmental sensors integrated into the mobile computing device.

4. The data-holding subsystem of claim 3, wherein the motion gesture includes a rotation of the mobile computing device along a relative X-axis of the mobile computing device and the application specific function includes a scrolling function.

5. The data-holding subsystem of claim 3, wherein the motion gesture includes a rotation of the mobile computing device along a relative Y-axis of the mobile computing device and the application specific function includes a change page function.

6. The data-holding subsystem of claim 3, wherein the motion gesture includes a rotation of the mobile computing device along a relative Z-axis of the mobile computing device and the application specific function includes a display rotation function.

7. The data-holding subsystem of claim 3, wherein the motion gesture includes a translation of the mobile computing device along a relative X-axis of the mobile computing device and the system-wide function includes an application switching function.

8. The data-holding subsystem of claim 3, wherein the motion gesture includes a translation of the mobile computing device along a relative Y-axis of the mobile computing device and the application specific function includes an editing function.

9. The data-holding subsystem of claim 3, wherein the motion gesture includes a translation of the mobile computing device along a relative Z-axis of the mobile computing device and the system-wide function includes a zoom function.

10. A computing device comprising:
    an extensible gesture recognition engine configured to:
      receive two or more different signals from two or more different types of sensors, responsive to receiving the two or more signals, determine a sensor type for each sensor from which the two or more signals are received, monitor each signal for sensor type specific patterns that are associated with the sensor type determined for that sensor, the sensor type specific patterns collectively corresponding to different possible composite gestures, for each of the two or more different signals, in response to identification of a sensor type specific pattern, recognize a possible composite gesture corresponding to that sensor type specific pattern, determine a confidence level for the possible composite gesture based on heuristics applied to the two or more different signals, and generate a composite gesture message for the possible composite gesture responsive to the confidence level being above a confidence threshold, the composite gesture message being usable by one or more applications of the computing device to provide an application specific function.

11. The computing device of claim 10, wherein the extensible gesture recognition engine is configured to recognize sensor type specific patterns corresponding to customized gestures defined by a third party software application or a third party hardware device.

12. The computing device of claim 10, wherein the extensible gesture recognition engine is configured to check for degradation of a signal responsive to the confidence level being below the confidence threshold, and upon detection of degradation of the signal, determine a new confidence level based on heuristics applied to non-degraded signals.

13. The computing device of claim 10, wherein at least one of the two or more different signals is received from a sensor of a remote computing device separate from but in communication with the computing device.

14. The computing device of claim 10, wherein a plurality of signals is received over a duration, and the extensible gesture recognition engine is configured to determine usage patterns of the plurality of signals learned for the duration, and the confidence level is further based on the usage patterns.

15. The computing device of claim 10, wherein the composite gesture message is usable by an operating system of the computing device to generate a system-wide function.

16. The computing device of claim 10, wherein the application specific function is mapped to the composite gesture message via an application programming interface.

17. The computing device of claim 16, wherein the sensor type includes one or more of an accelerometer, a gyroscope, a camera, a light sensor, and a touch sensor.

18. A computing device comprising:
an extensible gesture recognition engine comprising:
a recognition module configured to:
receive one or more signals,
determine a sensor type for each signal of the one or more signals,
monitor each signal for sensor type specific patterns that are associated with the sensor type determined for that signal, the sensor type specific patterns corresponding to different gestures,
for each signal, in response to identification of a sensor type specific pattern, generate a gesture corresponding to that sensor type specific pattern,
determine a confidence level for the gesture of each signal based on heuristics applied to the one or more signals, and
generate a gesture message for the gesture responsive to the confidence level being above a confidence threshold, the gesture message being usable by one or more applications of the computing device to provide an application specific function; and
a customization module configured to:
add a new signal to a list of available sensor signals used for gesture recognition in response to receiving the new signal from a sensor in communication with the extensible gesture recognition engine, and
define one or more customized composite gestures based on two or more signals from the list of available sensor signals.

19. The computing device of claim 18, wherein the customization module adds and defines, responsive to input from a third party software application or a third party hardware device.

\* \* \* \* \*